United States Patent
Fujimoto

(10) Patent No.: US 9,237,223 B2
(45) Date of Patent: Jan. 12, 2016

(54) COMMUNICATION TERMINAL, CONTROL METHOD, AND RECORDING MEDIUM

(71) Applicant: SHARP KABUSHIKI KAISHA, Osaka-shi, Osaka (JP)

(72) Inventor: Masahiro Fujimoto, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 21 days.

(21) Appl. No.: 14/352,006

(22) PCT Filed: Feb. 1, 2013

(86) PCT No.: PCT/JP2013/052398
§ 371 (c)(1),
(2) Date: Apr. 15, 2014

(87) PCT Pub. No.: WO2013/125331
PCT Pub. Date: Aug. 29, 2013

(65) Prior Publication Data
US 2015/0215446 A1    Jul. 30, 2015

(30) Foreign Application Priority Data

Feb. 23, 2012    (JP) ................................ 2012-037781

(51) Int. Cl.
| | |
|---|---|
| *H04M 1/00* | (2006.01) |
| *H04M 1/725* | (2006.01) |
| *H04M 1/56* | (2006.01) |
| *G06F 3/041* | (2006.01) |
| *G06F 3/0488* | (2013.01) |
| *H04M 1/2745* | (2006.01) |

(52) U.S. Cl.
CPC ......... *H04M 1/72583* (2013.01); *G06F 3/0412* (2013.01); *G06F 3/04883* (2013.01); *G06F 3/04886* (2013.01); *H04M 1/56* (2013.01); *G06F 2203/04808* (2013.01); *H04M 1/27455* (2013.01); *H04M 2250/22* (2013.01)

(58) Field of Classification Search
USPC ............ 455/566, 550.1, 556.1; 715/702, 864; 379/93.19, 216.01, 355.01
See application file for complete search history.

(56) References Cited

U.S. PATENT DOCUMENTS

| | | | | |
|---|---|---|---|---|
| 2008/0279361 | A1* | 11/2008 | Takaoka et al. | .......... 379/216.01 |
| 2010/0008490 | A1* | 1/2010 | Gharachorloo et al. | . 379/216.01 |
| 2010/0197353 | A1* | 8/2010 | Marui et al. | .................. 455/566 |
| 2011/0154259 | A1* | 6/2011 | Kennedy et al. | .............. 715/811 |
| 2013/0163733 | A1* | 6/2013 | Aerrabotu et al. | .......... 379/93.17 |

FOREIGN PATENT DOCUMENTS

| | | |
|---|---|---|
| JP | 2000-112636 A | 4/2000 |
| JP | 2005-72921 A | 3/2005 |

(Continued)

*Primary Examiner* — Fayyaz Alam
(74) *Attorney, Agent, or Firm* — Birch, Stewart, Kolasch & Birch, LLP

(57) ABSTRACT

A communication terminal (1) in accordance with the present invention includes a controlling section (12) for, when a touch operation to a key of a numeric keypad (22) in which each key is associated with a plurality of pieces of called party identifying information is detected, causing a plurality of pieces of called party identifying information that are associated with the key to be displayed, and, when a condition is detected in which one of the plurality of pieces of called party identifying information is selected, setting as a to-be-called phone number a phone number identified by the one of the plurality of pieces of called party identifying information.

8 Claims, 9 Drawing Sheets

(56) References Cited

FOREIGN PATENT DOCUMENTS

| JP | 2006-93901 A | 4/2006 |
| JP | 2008-283518 A | 11/2008 |
| JP | 2010-183172 A | 8/2010 |
| JP | 2011-114515 A | 6/2011 |

\* cited by examiner

COMMUNICATION TERMINAL, CONTROL METHOD, AND RECORDING MEDIUM

TECHNICAL FIELD

The present invention relates to a communication terminal including a touch panel and to a method for controlling the communication terminal. The present invention also relates to a program that causes a computer to function as such a communication terminal and to a recording medium in which such a program is stored.

BACKGROUND ART

Conventionally, communication terminals, such as a touch-tone fixed telephone, a facsimile and a mobile phone with a numeric keypad, generally have a so-called phonebook function that enables registration of persons' names and their phone numbers in the communication terminals. However, as the number of registered phone numbers increases, an increased number of steps are required when making a phone call to select a person whom a user wants to call. Therefore, many of such communication devices have an additional function to quickly call a certain person in a small number of steps.

One way to achieve the function of enabling a quick phone call is a method (Method 1) of calling a pre-registered phone number (called party's phone number) by pressing and holding a certain key. Another way to achieve the function is a method (Method 2) of making a phone call to a called party by inputting a one-digit or two-digit number previously registered in association with the called party's phone number. A method for realizing the function of enabling a quick phone call in a small number of steps in such a manner is called "abbreviated dialing" or "speed dialing" etc.

Recently, communication terminals with no numeric keypad for number/text input, such as smartphones, have been increasingly used. Such a communication terminal with no numeric keypad includes a touch panel to display an operation screen which is operable by directly touching it.

Many of these communication terminals carry out text input in the following manner, as disclosed in, for example, Patent Literature 1. That is, five Japanese Kana characters are associated with each key of a software keyboard displayed on the touch panel. By selecting a key by touching the touch panel with, for example, a stylus and thereafter moving the stylus upward, downward, rightward or leftward while still touching the touch panel (i.e., so-called flick input), a Kana character previously associated with the direction of the movement is selected. Such an input method has become a common way of text input into communication terminals.

These communication terminals which include a touch panel operable by touching an operation screen can have the following method (Method 3) in order to achieve the above-mentioned function of making a quick phone call. That is, for example, a shortcut is created on the operation screen which enables a one-touch dialing to a called party, and a phone call to the called party can be made by selecting the shortcut.

Furthermore, Patent Literature 2 discloses a telephone that has the following function (Method 4) of making a quick phone call. That is, by drawing a stroke on a tablet, a corresponding gesture is entered and a phone number associated with the gesture is called (calling process).

CITATION LIST

Patent Literatures

Patent Literature 1
Japanese Patent Application Publication, Tokukai, No. 2000-112636 A (Publication Date: Apr. 21, 2000)
Patent Literature 2
Japanese Patent Application Publication, Tokukai, No. 2006-093901 A (Publication Date: Apr. 6, 2006)

SUMMARY OF INVENTION

Technical Problem

However, Method 1 has a problem in that the number of phone numbers that can be previously registered in association with certain keys to be pressed and held is limited to the number of keys on the communication terminal.

Method 2 has a problem in that, although a phone number can be registered in association with a one-digit or two-digit number as an abbreviated dialing, it is difficult to memorize all the phone numbers registered in association with two-digit numbers. Another problem is that the number of phone numbers that can be registered in association with one-digit numbers 0 to 9, whose associated phone numbers are easy to memorize and which enable a phone call by the simplest operation, is limited to ten.

Function 3 has a problem in that the number of shortcuts that can be displayed on the operation screen is limited depending on the size of the operation screen (i.e., the size of the touch panel) of the communication terminal.

Function 4 has the following problem. That is, theoretically, the number of types of strokes is infinite. However, as the number of types of strokes increases, it becomes more difficult to memorize which phone number is associated with the stroke. Furthermore, as the stroke becomes more complicated, it becomes more difficult to memorize the stroke itself. Moreover, as the stroke becomes more complicated, the action of drawing the stroke becomes more complicated.

The present invention has been made in view of the above problems, and an object of the present invention is to provide a communication terminal in which (i) a to-be-called phone number can be set quickly by a simple operation and (ii) a desired called party can be selected by the simple operation from a larger number of called parties.

Solution to Problem

In order to attain the above object, a communication terminal in accordance with one aspect of the present invention includes: a display panel configured to display a plurality of keys; a touch panel configured to detect a touch operation by a user, the touch panel being on the display panel; and control means for, when the touch panel has detected a touch operation to one of the plurality of keys each of which is associated with a plurality of pieces of called party identifying information, causing the display panel to display a plurality of pieces of called party identifying information that are associated with the one of the plurality of keys, the control means being configured to, when the touch panel has detected a state in which one of the plurality of pieces of called party identifying information that are associated with the one of the plurality of keys is selected, set as a to-be-called phone number a phone number identified by the one of the plurality of pieces of called party identifying information.

In order to attain the above object, a method for controlling a communication terminal in accordance with one aspect of the present invention is a method for controlling a communication terminal including: a display panel configured to display a plurality of keys; and a touch panel configured to detect a touch operation by a user, the touch panel being on the display panel, said method including the steps of: when the touch panel has detected a touch operation to one of the plurality of keys each of which is associated with a plurality of pieces of called party identifying information, causing the display panel to display a plurality of pieces of called party identifying information that are associated with the one of the plurality of keys; and when the touch panel has detected a state in which one of the plurality of pieces of called party identifying information that are associated with the one of the plurality of keys is selected, setting as a to-be-called phone number a phone number identified by the one of the plurality of pieces of called party identifying information.

A program for causing a computer to operate as a communication terminal in accordance with one aspect of the present invention, said program causing the computer to function as each means of the communication terminal, and a computer-readable recording medium in which at least one of such programs is stored, are also encompassed in the scope of the present invention.

Advantageous Effects of Invention

As such, according to the communication terminal, (i) a to-be-called phone number can be set quickly by a simple operation and (ii) a desired called party can be selected by the simple operation from a larger number of called parties.

DESCRIPTION OF EMBODIMENTS

Embodiment 1

The following description discusses, with reference to FIGS. 1 to 6, one embodiment of a communication terminal in accordance with the present invention. Note, however, that, unless otherwise specified, configurations described in the present embodiment are merely examples and are not intended to limit the scope of the present invention to such configurations.

[Configuration of Communication Terminal]

Figure 1:
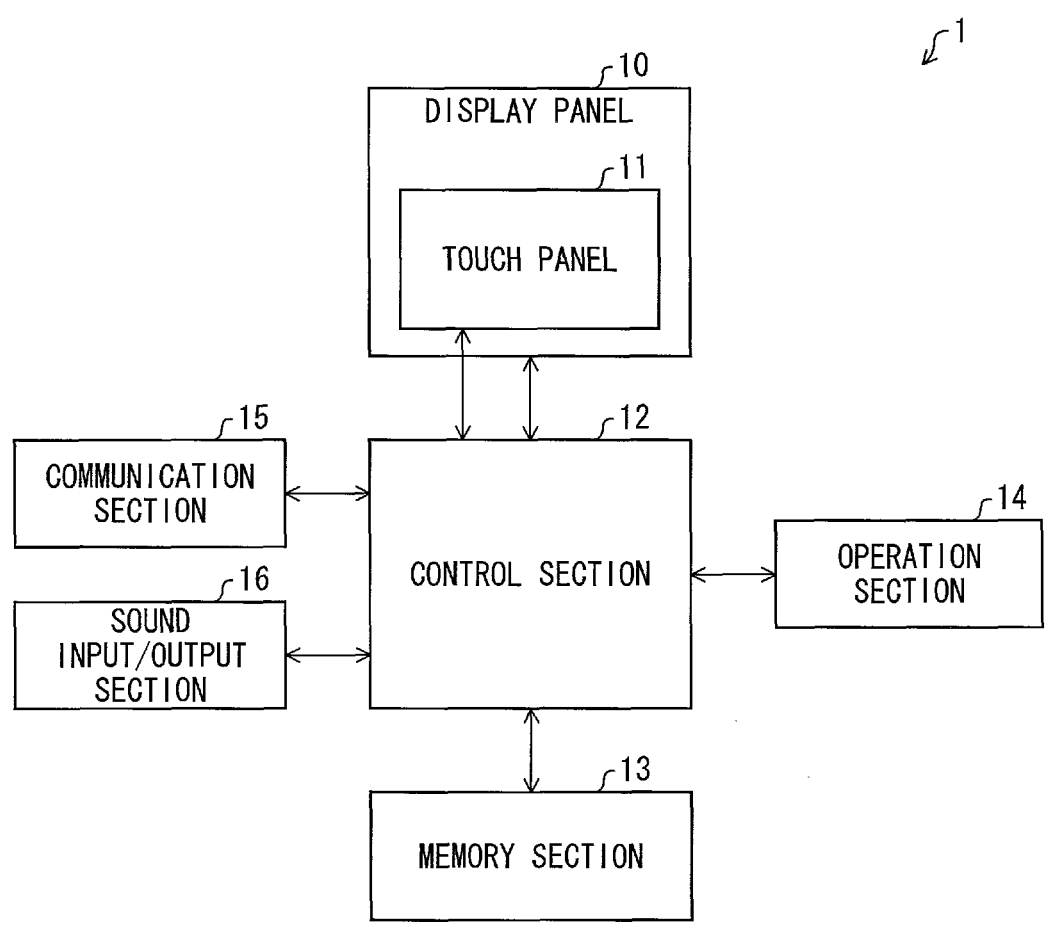
FIG. 1 is a block diagram schematically illustrating a configuration of a communication terminal in accordance with one embodiment of the present invention.

The following description discusses a communication terminal in accordance with the present embodiment with reference to FIG. 1. FIG. 1 is a block diagram illustrating a configuration of a communication terminal 1 in accordance with the present embodiment.

As illustrated in FIG. 1, the communication terminal 1 includes a display panel 10, a touch panel 11, a control section (control means) 12, a memory section 13, an operation section 14, a communication section 15 and a sound input/output section 16.

(Display Panel)

Figure 2:
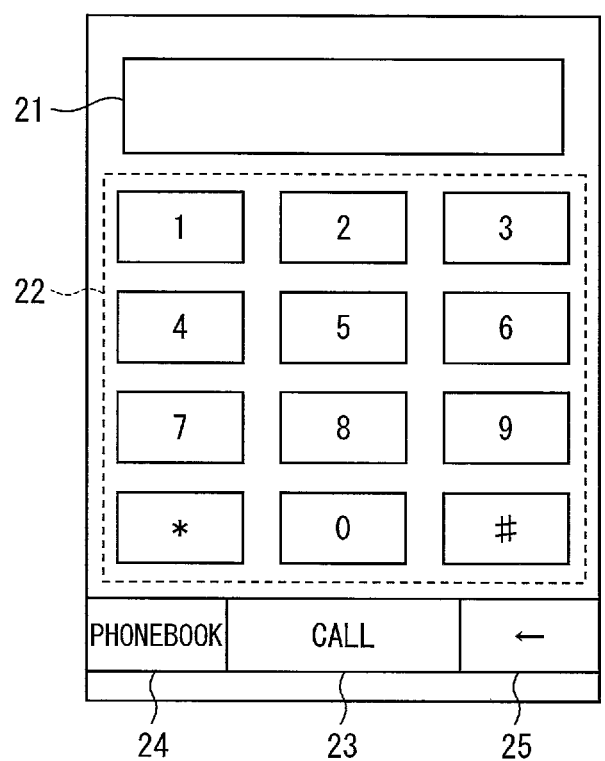
FIG. 2 illustrates an example of a user interface displayed on a display panel of the communication terminal in accordance with the one embodiment of the present invention.

The display panel 10 displays a user interface via which a user's input operation is received. An example of the user interface is, but not limited to, a user interface (numeric keypad) in the form of an operation screen via which a user inputs numbers (see FIG. 2). FIG. 2 will be described later in detail.

(Touch Panel)

The touch panel 11 is provided on the display panel 10 and detects a user's touch operation to the display panel 10 by, for example, detecting a change in capacitance. Specifically, the touch panel 11 determines, by detecting a change in capacitance in the touch panel 11, where on the display panel 10 (i.e., where on the touch panel 11) is touched by a user's finger or a touch pen etc.

The touch panel 11 is not limited to a capacitive touch panel, and may be any other touch panel provided that it is configured to detect a user's touch operation to the display panel 10.

(Control Section)

The control section 12 includes a CPU (central processing unit) and causes the display panel 10 to display the user interface by executing a program stored in the memory section 13. The control section 12 controls each section of the communication terminal 1 in accordance with a user's input operation received via the user interface displayed on the display panel 10.

Furthermore, the control section 12 controls operations related to phone calls on the communication terminal 1 as a whole.

(Memory Section)

The memory section 13 includes (i) a readable but not writable memory (ROM) in which fixed data is stored such as a program to be executed by the control section 12 and (ii) a readable and writable memory (RAM) in which variable data are stored such as data to be referenced by the control section 12 when an operation is carried out and data generated by the operation by the control section 12.

The RAM of the memory section 13 stores therein a so-called phonebook which includes a phone number and the name of a person (called party) who owns a to-be-called communication terminal 1 identified by the phone number. The phone number and the name of the person are associated with each other.

(Operation Section)

The operation section 14 is means to receive user's various operations (user's instructions). The operation section 14 is constituted by, for example, operation buttons. The operation section 14 includes, for example, a power button to turn on and off the communication terminal 1.

The present embodiment is described based on an example in which the numeric keypad (a plurality of keys) displayed as a user interface on the display panel 10 is not a constituent of the operation section 14. Note however that, needless to say, it is possible to employ a configuration in which the operation section 14 is constituted by a numeric keypad etc.

(Communication Section)

The communication section 15 receives, from the control section 12, a calling instruction to call a communication terminal identified by a phone number, and, in response to the calling instruction, calls (dials) the communication terminal and thereby a voice call is established between the communication terminal 1 and the called communication terminal.

(Sound Input/Output Section)

The sound input/output section 16 includes (i) a sound input section (e.g., microphone) via which sound is inputted during a voice call and (ii) a sound output section (e.g., speaker) via which sound is outputted.

[User Interface]

The following description discusses, with reference to FIG. 2, the user interface displayed on the display panel 10 of the present embodiment. The user interface here is in the form of a numeric keypad via which a user inputs a phone number of a called party. FIG. 2 illustrates an example of the user interface displayed on the display panel 10 in accordance with the present embodiment.

As illustrated in FIG. 2, the user interface in the form of a numeric keypad displayed on the display panel 10 includes (i) a numeric keypad 22 via which numbers are inputted, (ii) a CALL button 23 via which an instruction to call the inputted numbers (phone number) is entered, (iii) a PHONEBOOK button 24 via which an instruction to display the phonebook is entered, and (iv) a left arrow button 25 ("←" in FIG. 1) via which an instruction to delete the inputted numbers one by one from the position where there is a cursor (not illustrated) is entered. The user interface in the form of a numeric keypad further includes, as illustrated in FIG. 2, a number display area 21 where the numbers inputted by touching the numeric keypad 22 (touching the touch panel 11) are to be displayed on the display panel 10. The numeric keypad 22 includes numeric keys "0" to "9" and symbol keys "*" and "#".

The communication terminal 1 receives a user's input operation (touch to the numeric keys of the numeric keypad 22 displayed on the display panel 10) to thereby accept an input of a to-be-called phone number. The communication terminal 1 displays the inputted phone number in the number display area 21.

Furthermore, the communication terminal 1, upon receiving an input operation (calling instruction) which is a user's touch to the CALL button 23, initiates a call to the inputted phone number.

Furthermore, the communication terminal 1, upon receiving an input operation (phonebook displaying instruction) which is a user's touch to the PHONEBOOK button 24, cancels the display of the user interface in the form of a numeric keypad and displays the phonebook stored in the memory section 13.

[Speed Dialing (Quick Phone Call) Process]

The following description discusses, with reference to FIGS. 3 to 6, a process carried out when a call is made by speed dialing on the communication terminal 1 of the present embodiment.

According to the present embodiment, phone numbers and names of a plurality of called parties, whom a user may want to call by a simple operation, are previously associated with the numeric keys "0" to "9" and symbol keys "*" and "#" of the numeric keypad 22. These data may be stored in, for example, the RAM of the memory section 13. It should be noted that information to identify a called party, such as the called party's phone number and name, may be referred to as "called party identifying information". The called party identifying information is not limited to called party's phone number and name, but may be family relationship, address or photograph of a called party's face, provided that the information identifies the called party.

Figure 3:
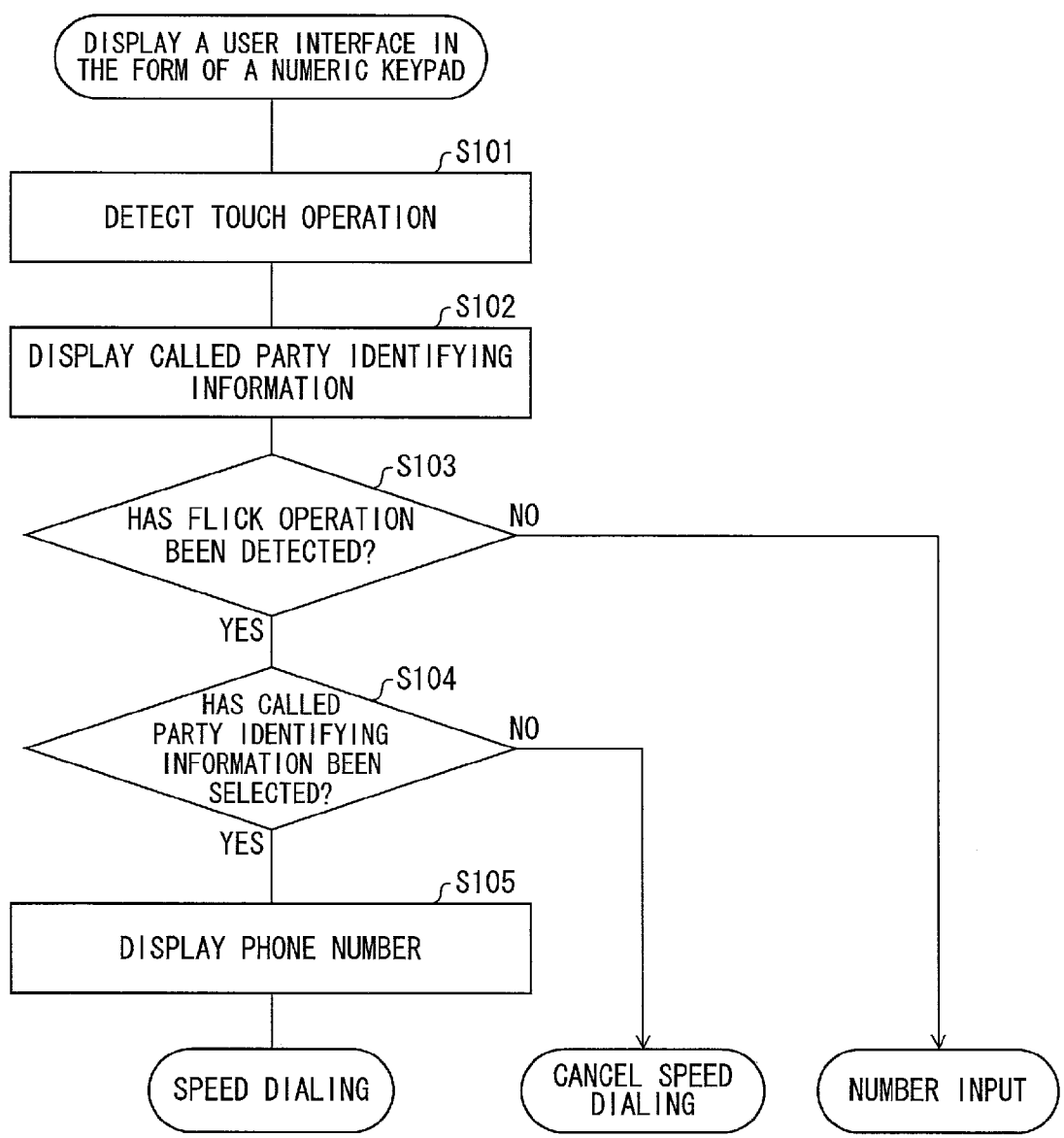
FIG. 3 is a flow chart showing a sequence of the steps of a speed dialing process on the communication terminal in accordance with the one embodiment of the present invention.

FIG. 3 is a flow chart showing a sequence of the steps of the speed dialing process on the communication terminal 1 of the present embodiment.

Figure 4:
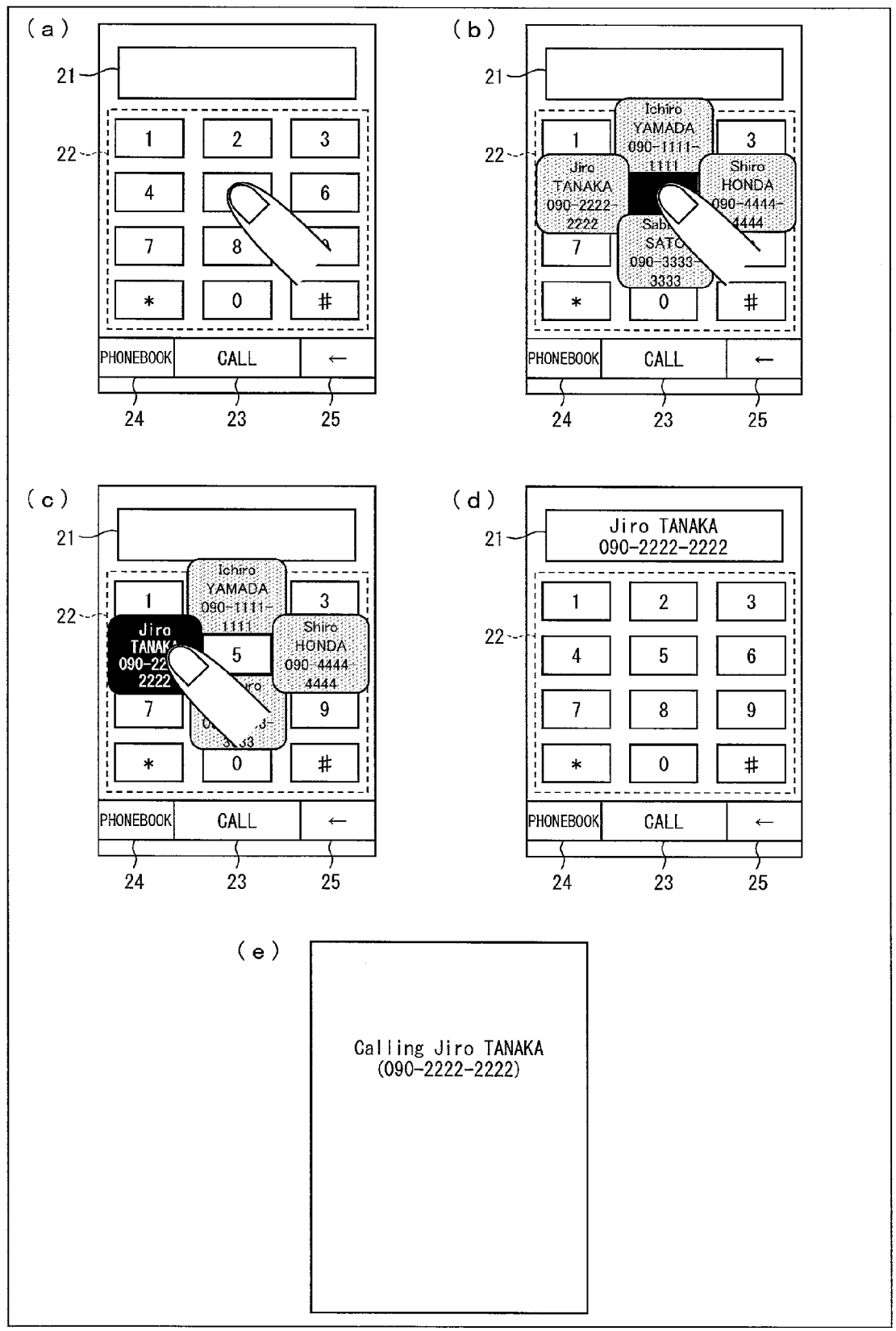
FIG. 4 is a screen flow diagram illustrating an example of a transition of a screen displayed on the display panel when the speed dialing process is carried out on the communication terminal in accordance with the one embodiment of the present invention.

FIG. 4 is a screen flow diagram illustrating an example of a transition of a screen displayed on the display panel 10 when the speed dialing process is carried out on the communication terminal 1 of the present embodiment. (a) of FIG. 4 illustrates a screen displayed when a user has just touched the touch panel 11, (b) of FIG. 4 illustrates a screen displayed when pieces of called party identifying information associated with the numeric key touched by the user are displayed, and (c) of FIG. 4 illustrates a screen displayed when the user selects a phone number from the displayed phone numbers. Furthermore, (d) of FIG. 4 illustrates a screen displayed when the phone number selected by the user is displayed in the number display area 21, and (e) of FIG. 4 illustrates a screen displayed when the phone number selected by the user is being called.

As shown in FIG. 3, the touch panel 11, which is displaying the user interface in the form of a numeric keypad, detects a user's touch operation (step S101). It should be noted that, although the present embodiment is described based on an example in which the user's touch operation is carried out with a user's finger, the touch operation may be carried out with a touch pen etc.

When the touch panel 11 has detected the touch operation, the control section 12 causes pieces of called party identifying information associated with the touched numeric key to be displayed so that they overlie the user interface in the form of a numeric keypad (step S102). For example, in a case where the numeric key "5" is touched by the touch operation, the screen displayed on the display panel 10 changes from the screen on which the user interface is displayed (see (a) of FIG. 4) to the screen on which the pieces of called party identifying information are displayed so as to overlie the user interface (see (b) of FIG. 4).

According to the present embodiment, four pieces of called party identifying information associated with the numeric key "5" are displayed on top, bottom, left and right of the numeric key "5" (so that the pieces of called party identifying information overlap the numeric keys "2", "4", "6" and "8", respectively) (see (b) of FIG. 4).

Next, the control section 12 determines whether (i) a so-called flick operation on the touch panel 11 is detected in which operation the user moves the finger to a piece of called party identifying information displayed around the touched numeric key while still touching the touch panel or (ii) an operation in which the finger is released without carrying out the flick operation is detected (step S103).

If the flick operation has been detected by the touch panel 11 (YES in step S103), the control section 12 determines whether or not the piece of called party identifying information displayed around the numeric key has been selected as a result of the flick operation (step S104).

If the control section 12 has determined that the piece of called party identifying information has been selected by the flick operation (step S104), the control section 12 causes a phone number included in the selected piece of called party identifying information to be displayed in the number display area 21 (step S105). For example, in a case where a piece of called party identifying information overlapping the numeric key "4" is selected by a flick operation (as shown in (c) of FIG. 4), the screen displayed on the display panel 10 changes to the screen shown in (d) of FIG. 4 in which a phone number included in the selected piece of called party identifying information is displayed as a to-be-called phone number in the number display area 21.

When a calling instruction is received from the user while the phone number included in the selected piece of called party identifying information is displayed in the number display area 21, the control section 12 calls the displayed phone number. When the phone number is called, the screen displayed on the display panel 10 changes to a calling screen as illustrated in (e) of FIG. 4.

On the other hand, if no flick operation has been detected by the touch panel 11 (NO in step S103), that is, if an operation of releasing the finger from the touch panel 11 without the flick operation has been detected, the control section 12 may accept an input of a number corresponding to the touched numeric key as a digit of a phone number. For example, in a case where a user wants to merely input the number "5" that serves as a digit of a phone number, the user may touch the numeric key "5" of the numeric keypad 22 with a finger etc. and then release the finger etc. without carrying out a flick operation.

If a flick operation was carried out but no called party identifying information was selected (NO in step S104), the control section 12 determines that the selection of a piece of called party identifying information has been canceled. The control section 12 then cancels the speed dialing process and cancels the display of the pieces of called party identifying information.

As has been described, the communication terminal 1 of the present embodiment enables a quick phone call by a simple operation of (i) touching any numeric key of the numeric keypad 22 to thereby display a plurality of pieces of called party identifying information associated with the numeric key and thereafter (ii) carrying out a flick operation to thereby select a called party. Furthermore, according to the communication terminal 1 of the present embodiment, a plurality of pieces of called party identifying information can be registered in association with each numeric key of the numeric keypad 22. Therefore, it is possible to select, from a larger number of phone numbers, a called party by the above simple operation.

With this configuration, a user can quickly call a desired called party by a simple operation of (i) touching a numeric key of the numeric keypad 22 to thereby display a plurality of pieces of called party identifying information associated with the numeral key and (ii) selecting the desired called party from the plurality of pieces of called party identifying information. Furthermore, in a case where the user carries out the touch operation by, for example, the user's finger, the user can quickly call the desired called party simply by a simple operation of moving the finger from the touched position to a desired piece of called party identifying information while still touching the panel.

Furthermore, according to the present embodiment, (i) the numeric keypad 22 is constituted by twelve keys including ten numeric keys 0 to 9 and two symbol keys "#" and "*" and (ii) each of the twelve keys is associated with four pieces of called party identifying information. Therefore, a user can select any of the 48 (12×4=48) pieces of called party identifying information simply by the above simple operation.

In addition, since a user can select a desired piece of called party identifying information from a plurality of pieces of called party identifying information simply by the above simple operation, the user does not have to memorize which piece of called party identifying information is associated with which key.

Furthermore, with the above configuration, a user can carry out, on a single display, both (i) an operation to call a called party simply by a simple operation and (ii) an operation to merely input numbers to enter a phone number.

(How to Cancel Operation to Select Called Party Identifying Information)

Figure 5:
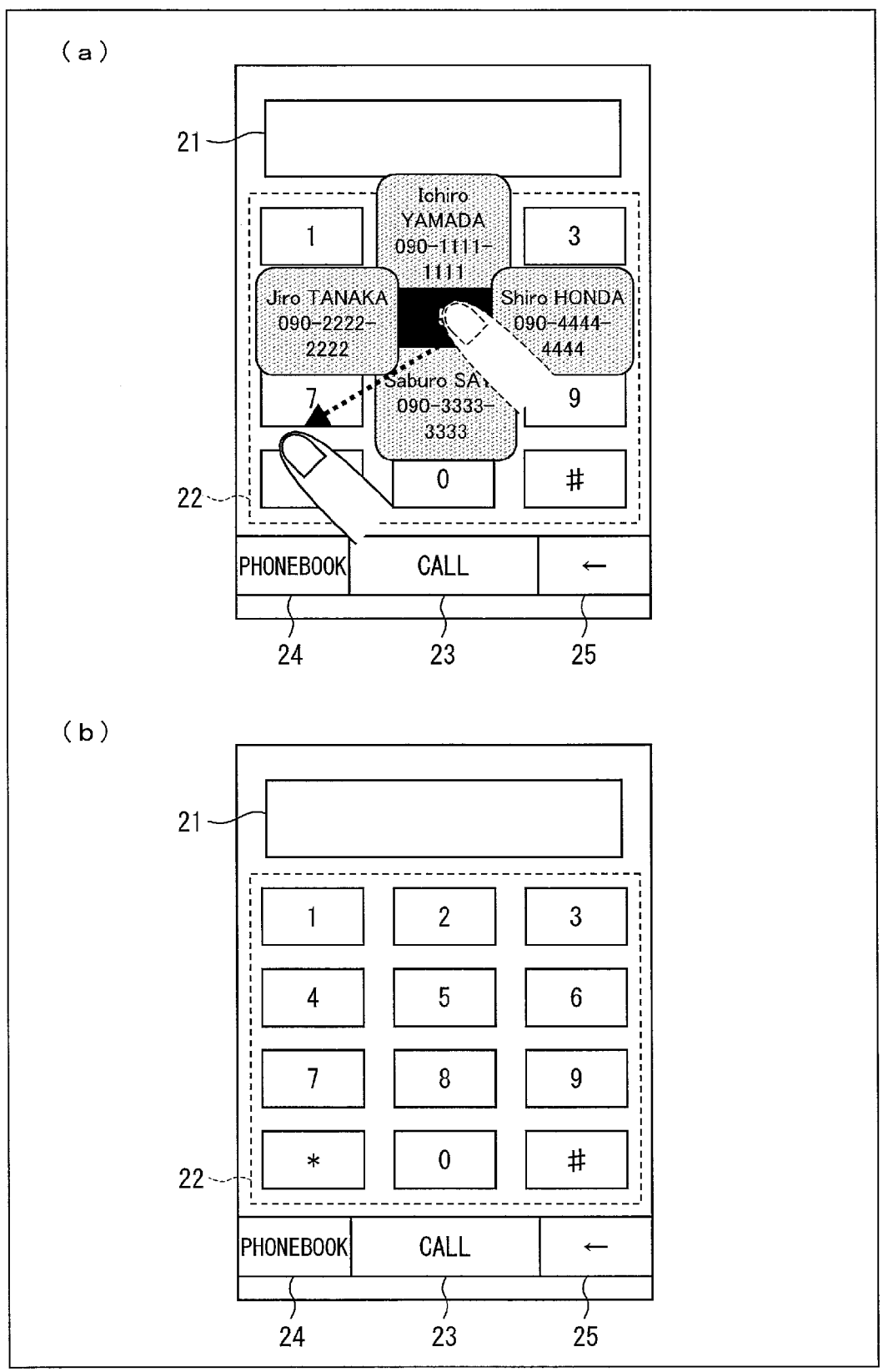
FIG. 5, which shows the one embodiment of the present invention, illustrates an example of the screen displayed on the display panel in a case where no called party identifying information can be displayed on the edge side.

How to cancel an operation to select a piece of called party identifying information is specifically described with reference to FIG. 5. FIG. 5 is a screen flow diagram illustrating an example of a transition of a screen displayed on the display panel 10 in a case where an operation to select a piece of called party identifying information is canceled. (a) of FIG. 5 shows a screen displayed before the operation to select a piece of called party identifying information is canceled, and (b) of FIG. 5 shows a screen displayed after the operation is canceled.

For example, there may be a case in which, when a user touched the numeric key "5" of the numeric keypad 22 and thereby pieces of called party identifying information were displayed, the user finds out that the pieces of called party identifying information do not include the user's desired piece of called party identifying information (i.e., the desired piece of called party identifying information is not associated with the numeric key "5"). Furthermore, there may be a case in which a user accidentally touches the numeric key "5" of the numeric keypad 22 although the user wants to select a piece of called party identifying information from those which are associated with the numeric key "4" of the numeric keypad 22.

When the user accidentally touches the numeric key "5" of the numeric keypad 22 while the user interface in the form of a numeric keypad is displayed like above, the four pieces of called party identifying information associated with the numeric key "5" are displayed so that they overlie the user interface in the form of a numeric keypad.

In a case where the user wants to cancel the operation to select a piece of called party identifying information in this state, the user may release a finger from the touch panel 11 after carrying out a flick operation to an area where no called party identifying information is displayed, that is, after selecting an area other than where the pieces of called party identification information are displayed (see (a) of FIG. 5). When such a flick operation is carried out by the user, the operation to select a piece of called party identifying information is canceled. The screen displayed on the display panel 10 changes from the screen shown in (a) of FIG. 5 to the screen shown in (b) of FIG. 5.

This allows a user to easily cancel the operation to select a piece of called party identifying information when the user finds out that his/her desired piece of called party identifying information is not associated with the numeric key he/she touched (i.e., when the desired piece of called party identifying information is not displayed).

The present embodiment is described based on an example in which, when a user carries out a touch operation while the user interface in the form of a numeric keypad is displayed, pieces of called party information are displayed immediately. Note, however, that the present invention is not limited to such. For example, it is also possible to employ a configuration in which pieces of called party identifying information are displayed after a certain period of time from when a touch operation is carried out by a user.

Furthermore, the present embodiment is described based on an example in which (i) a called party is selected, (ii) a phone number of the called party thus selected is displayed in the number display area 21 and thereafter (iii) a call to the called party is made upon reception of the user's calling instruction. Note, however, that the present invention is not limited to such. For example, it is also possible to employ a configuration in which a call to the called party's phone number is made immediately after the called party is selected. In this case, the screen displayed on the display panel 10 changes from the screen shown in (c) of FIG. 4 to the screen shown in (d) of FIG. 4.

The present embodiment is described based on an example in which four pieces of called party identifying information associated with a selected numeric key are displayed on top, bottom, left and right of the selected numeric key. Note, however, that the present invention is not limited to such. For example, it is also possible to employ a configuration in which the pieces of called party identifying information are displayed on diagonal lines passing though the selected numeric key (i.e., displayed so as to overlap the numeric keys "1", "3", "7" and "9", respectively).

Figure 6:
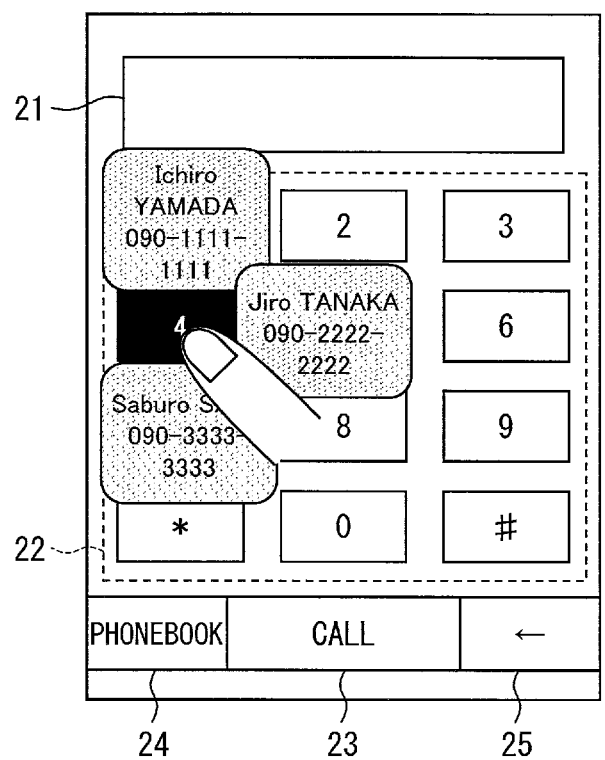
FIG. 6, which shows the one embodiment of the present invention, is a screen flow diagram illustrating an example of a transition of a screen displayed on the display panel in a case where an operation to select a piece of called party identifying information is canceled.

In a case where pieces of called party identifying information associated with a numeric key near an edge of the display panel 10 (e.g., the numeric key "4" of the numeric keypad 22) are to be displayed, no called party identifying information can be displayed where there is the edge (in FIG. 6, on the opposite side of the numeric key "6") of the display panel 10, as illustrated in FIG. 6. In this case, the pieces of called party identifying information may be displayed only in an area where they can be displayed (in FIG. 6, on the numeric key "6" side).

MODIFIED EXAMPLE 1

Figure 7:
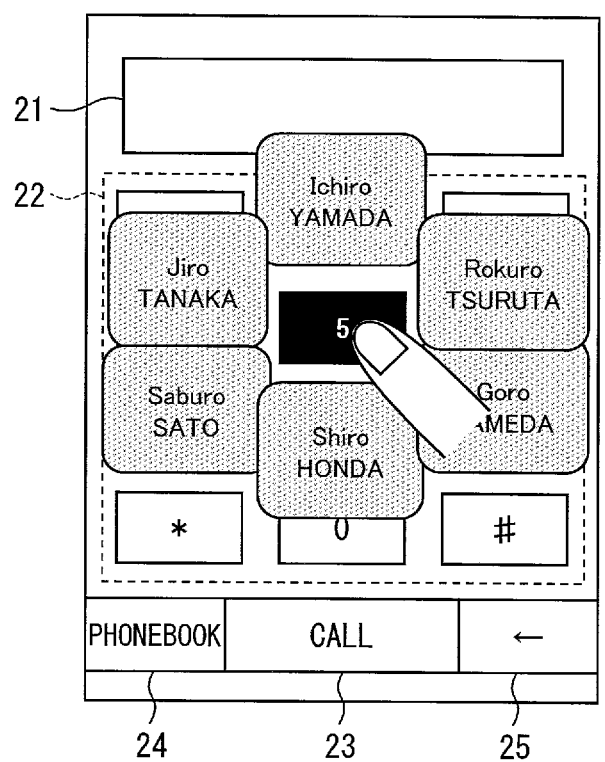
FIG. 7 illustrates a screen displayed on a display panel of a communication terminal in accordance with a modified example of the one embodiment of the present invention when called party's names associated with a numeric key touched by a user are displayed.

Embodiment 1 is described based on an example in which each numeric key of the numeric keypad 22 is associated with four pieces of called party identifying information. Note, however, that the present invention is not limited to such. Modified Example 1 will discuss, with reference to FIG. 7, a case where (i) each numeric key of a numeric keypad 22 is associated with six pieces of called party identifying information and (ii) only called parties' names included in the pieces of called party identifying information are displayed when the numeric key is touched. FIG. 7 illustrates a display screen of a communication terminal 1 of the present example on which the called parties' names included in the pieces of called party identifying information associated with the numeric key touched by a user are displayed.

According to the communication terminal 1 of the present example, when the numeric key "5" of the numeric keypad 22 is touched while a user interface in the form of a numeric keypad for input of phone numbers is displayed on a display panel 10, only the called parties' names included in the six pieces of called party identifying information associated with the numeric key "5" are displayed around the numeric key "5" so that they overlie the user interface in the form of a numeric keypad (see FIG. 7).

The called parties' names included in the six pieces of called party identifying information associated with the numeric key "5" are, as illustrated in FIG. 7, displayed at the vertices of a hexagon centered on the numeric key "5". It is needless to say that the positions where the called parties' names are displayed are not limited to such. For example, it is also possible to employ an arrangement in which three called parties' names are displayed on each of the left and right sides (in FIG. 7, on the numeric key "4" side and the numeric key "6" side) of the numeric key "5".

Furthermore, according to the present example, only the called parties' names included in the pieces of called party identifying information are displayed (see FIG. 7); however, the present invention is not limited to such. For example, only phone numbers may be displayed as pieces of called party identifying information or both phone numbers and called parties' names (i.e., called party identifying information) may be displayed.

According to the arrangement, the communication terminal 1 of the present example is such that (i) the numeric keypad 22 is constituted by twelve keys including ten numeric keys 0 to 9 and two symbol keys "#" and "*" and (ii) each of the twelve keys is associated with six pieces of called party identifying information. Therefore, a user can select any of the 72 (12×6=72) pieces of called party identifying information simply by the earlier-mentioned simple operation.

MODIFIED EXAMPLE 2

Figure 8:
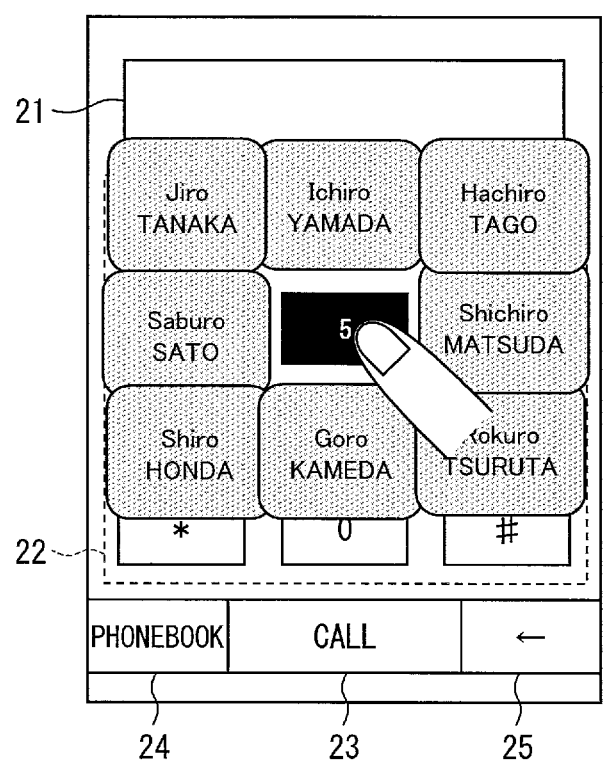
FIG. 8 illustrates a screen displayed on a display panel of a communication terminal in accordance with another modified example of the one embodiment of the present invention when called party's names associated with a numeric key touched by a user are displayed.

Embodiment 1 is described based on an example in which each numeric key of the numeric keypad 22 is associated with four pieces of called party identifying information. Note, however, that the present invention is not limited to such. Modified Example 2 will discuss, with reference to FIG. 8, a case where (i) each numeric key of a numeric keypad 22 is associated with eight pieces of called party identifying information and (ii) only called parties' names included in the pieces of called party identifying information are displayed when the numeric key is touched. FIG. 8 illustrates a display screen of a communication terminal 1 of the present example on which the called parties' names included in the pieces of called party identifying information associated with the numeric key touched by a user are displayed.

According to the communication terminal 1 of the present example, when the numeric key "5" of the numeric keypad 22 is touched while a user interface in the form of a numeric keypad for input of phone numbers is displayed on a display panel 10, only the called parties' names included in the eight pieces of called party identifying information associated with the numeric key "5" are displayed around the numeric key "5" so that they overlie the user interface in the form of a numeric keypad (see FIG. 8).

The called parties' names included in the eight pieces of called party identifying information associated with the numeric key "5" are, as illustrated in FIG. 8, displayed at the vertices and sides of a quadrangle centered on the numeric key "5". It is needless to say that the positions where the called parties' names are displayed are not limited to such. For example, it is also possible to employ an arrangement in which four called parties' names are displayed on each of the left and right sides (in FIG. 8, on the numeric key "4" side and the numeric key "6" side) of the numeric key "5".

Furthermore, according to the present example, only the called parties' names included in the pieces of called party identifying information are displayed (see FIG. 8); however, the present invention is not limited to such. For example, only phone numbers may be displayed as pieces of called party identifying information or both phone numbers and called parties' names (i.e., called party identifying information) may be displayed.

According to the arrangement, the communication terminal 1 of the present example is such that (i) the numeric keypad 22 is constituted by twelve keys including ten numeric keys 0 to 9 and two symbol keys "#" and "*" and (ii) each of the twelve keys is associated with eight pieces of called party identifying information. Therefore, a user can select any of the 96 (12×8=96) pieces of called party identifying information simply by the earlier-mentioned simple operation.

MODIFIED EXAMPLE 3

The present embodiment is described based on an example in which, when a numeric key of the numeric keypad 22 is touched by a user, pieces of called party identifying information associated with the numeric key are displayed around the numeric key. Note, however, that the present invention is not limited to such.

Figure 9:
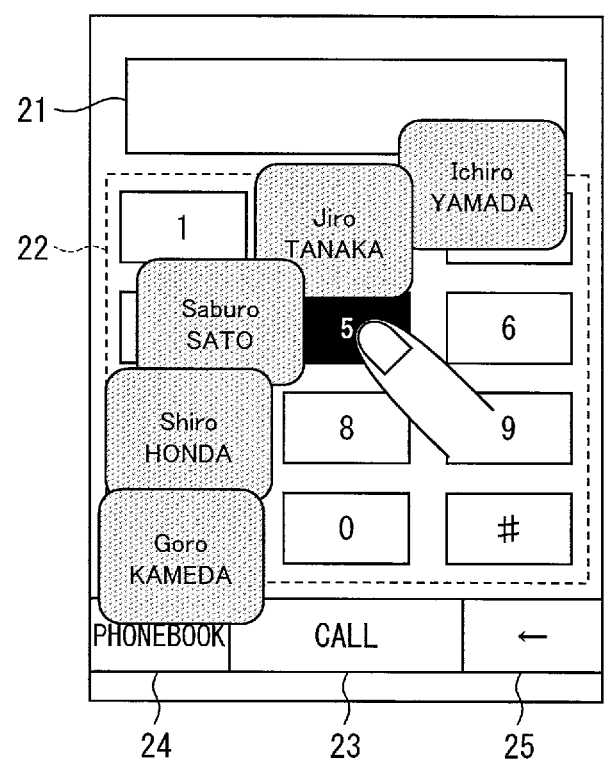
FIG. 9 illustrates an example of a screen displayed on a display panel of a communication terminal in accordance with a further modified example of the one embodiment of the present invention when called parties' names associated with a numeric key touched by a user are displayed.

For example, it is also possible to employ an arrangement in which, as illustrated in FIG. 9, the pieces of called party identifying information associated with the numeric key touched by the user are displayed along a curve. FIG. 9 illustrates an example of a screen displayed on a display panel of a communication terminal 1 in accordance with Modified Example 3 of the present embodiment on which called parties' names included in pieces of called party identifying information associated with a numeric key touched by a user are displayed.

According to the communication terminal 1 of the present example, when the numeric key "5" of the numeric keypad 22 is touched, only called parties' names included in five pieces of called party identifying information associated with the numeric key "5" are displayed along a curve so that they overlie a user interface in the form of a numeric keypad (see FIG. 9). It should be noted that, although the present example is described based on an example in which only the called parties' names included in the pieces of called party identifying information are displayed, the present invention is not limited to such. For example, only phone numbers may be displayed or other kinds of called party identifying information may be displayed.

As has been described, the positions on the communication terminal 1 of the present invention where pieces of called party identifying information are to be displayed are not limited to those around a numeric key. For example, it is possible to employ an arrangement in which the pieces of called party identifying information are displayed along a vertical line or a horizontal line, are displayed in part of an area surrounding the numeric key, or are displayed at random.

[Program, Recording Medium]

The control section 12 may be realized by a logic circuit (hardware) provided in an integrated circuit (IC chip) or may be realized by software as executed by a CPU (Central Processing Unit).

In the latter case, the control section 12 includes, for example, a CPU and memory devices (recording media). The CPU executes instructions in programs realizing the functions. The memory devices include a ROM (read only memory) which contains the programs, a RAM (random access memory) to which the programs are loaded, and a memory for the programs and various data. The object of the present invention can also be achieved by mounting to the control section 12 a computer-readable recording medium containing control program code (executable program, intermediate code program, or source program) for the control section 12 which is software realizing the aforementioned functions, in order for the computer (or CPU, MPU) to retrieve and execute the program code contained in the recording medium.

Examples of the recording medium include: disks and discs such as magnetic disks (e.g., hard disk) and optical discs such as CD-ROM, CD-R, CD-RW, MO, DVD-ROM, DVD-R, DVD-RW, Blu-ray disc (BD)-ROM, BD-R and BD-RE; cards such as IC cards (including memory cards) and optical cards; and semiconductor memories such as mask ROM, EPROM, EEPROM (registered trademark) and flash memories.

The program code may be made available to the control section 12 over the communications network. The communications network is not limited in any particular manner, provided that it is capable of transferring the program code. The communications network may be, for example, the Internet, LAN, CATV communications network, telephone line network or mobile communications network. The transfer medium which makes up the communications network is not limited to a particular structure or kind, and may be, for example: wired line such as a metal cable (e.g., telephone line, LAN cable, cable TV line) or an optical fiber (e.g., FTTH); or wireless such as electric wave (e.g., mobile communications line, WLAN) or infrared radiation (e.g., IrDA, remote control).

[Closing]

In order to attain the above object, a communication terminal of one aspect of the present invention includes: a display panel configured to display a plurality of keys; a touch panel configured to detect a touch operation by a user, the touch panel being on the display panel; and control means for, when the touch panel has detected a touch operation to one of the plurality of keys each of which is associated with a plurality of pieces of called party identifying information, causing the display panel to display a plurality of pieces of called party identifying information that are associated with the one of the plurality of keys, the control means being configured to, when the touch panel has detected a state in which one of the plurality of pieces of called party identifying information that are associated with the one of the plurality of keys is selected, set as a to-be-called phone number a phone number identified by the one of the plurality of pieces of called party identifying information.

The communication terminal above is configured to (i) display the plurality of pieces of called party identifying information associated with the key to which the touch operation was carried out and (ii) set, as a to-be-called phone number, a phone number identified by a piece of called party identifying number selected from the plurality of pieces of called party identifying information. This allows a user to set a to-be-called phone number quickly by a simple operation of (i) touching any of the plurality of keys to thereby display a plurality of pieces of called party identifying information associated with the touched key and (ii) selecting a desired called party from the plurality of pieces of called party identifying information.

Furthermore, since each of the plurality of keys is associated with a plurality of pieces of called party identifying information, the user can select a desired called party from a larger number of called parties by the simple operation The communication terminal in accordance with one aspect of the present invention is preferably configured such that the control means is configured to call the phone number which has been set as the to-be-called phone number.

According to the configuration, the user can quickly call the phone number which has been set by the simple operation as the to-be-called phone number.

The communication terminal in accordance with one aspect of the present invention is preferably configured such that the control means is configured to (i) cause the display panel to display the phone number which has been set as the to-be-called phone number and (ii) call the phone number in response to an instruction by the user.

According to the configuration, since the phone number which has been set as the to-be-called phone number by the simple operation is displayed on the display panel, the user can check the phone number thus set and also can call the to-be-called phone number quickly.

The communication terminal in accordance with one aspect of the present invention is preferably configured such that the one of the plurality of pieces of called party identifying information is selected by a flick operation starting from the one of the plurality of keys which is touched by the touch operation.

According to the configuration, the control means determines, when a piece of called party identifying information is selected by a flick operation starting from the key touched by the touch operation, that the piece of called party identifying information has been selected.

With the configuration, the user can quickly make a call to a desired called party by a simple operation of moving a finger (in a case where the touch operation is carried out with a finger) from the touched key to a desired piece of called party identifying information while still touching the panel.

The communication terminal in accordance with one aspect of the present invention is preferably configured such that the control means is configured to cancel the display of the plurality of pieces of called party identifying information that are associated with the one of the plurality of keys when, after the one of the plurality of keys is touched by the touch operation, the touch panel has detected a state in which a flick operation has been carried out by which an area of the display panel other than where the plurality of pieces of called party identifying information that are associated with the one of the plurality of keys are displayed is selected.

According to the configuration, the control means cancels the display of the plurality of pieces of called party identifying information when none of the plurality of pieces of called party identifying information were selected by the flick operation. With the configuration, the user can easily cancel the operation to select the called party identifying information when the user finds out that his/her desired piece of called party identifying information is not associated with the touched key (i.e., when his/her desired piece of called party identifying information is not displayed).

The communication terminal in accordance with one aspect of the present invention is preferably configured such that the plurality of keys constitute a numeric keypad including a plurality of numeric and symbol keys.

According to the communication terminal configured like above, a plurality of pieces of called party identifying information can be registered in association with each of the plurality of numeric and symbol keys constituting the numeric keypad. With the configuration, in a case where, for example, (i) the numeric keypad is constituted by twelve keys including ten numeric keys 0 to 9 and two symbol keys "#" and "*" and (ii) each of the twelve keys is associated with four pieces of called party identifying information, a user can select any of the 48 (12×4=48) pieces of called party identifying information simply by the above simple operation.

Furthermore, since the user can select a desired piece of called party identifying information from the plurality of pieces of called party identifying information simply by the simple operation, the user can select a desired called party without inconvenience even in a case where the user does not clearly remember which called party identifying information is associated with which key. Moreover, after touching a key that is associated with the desired piece of called party identifying information, the user can select the desired piece of called party identifying information from a plurality of visually displayed pieces of called party identifying information displayed upon touching the key.

The communication terminal in accordance with one aspect of the present invention is preferably configured such that the control means is configured to, when the touch panel has detected a state in which the touch panel has become untouched after being touched without the flick operation, cancel the display of the plurality of pieces of called party identifying information that are associated with the one of the plurality of keys and accept, as a number directly inputted to identify a called party, a number corresponding to the one of the plurality of keys which was touched by the touch operation.

According to the configuration, the control means is configured to, when a user's finger etc. touched the touch panel (the touch operation) and then was released from the touch panel without the flick operation, cancel the display of the plurality of pieces of called party identifying information. Furthermore, the control means accepts, as a number that is a digit of a to-be-called phone number, a number corresponding to the one of the plurality of keys which is touched by the touch operation.

With the configuration, the user can carry out, on a single screen, both (i) an operation to make a phone call to a called party simply by a simple operation and (ii) an operation to merely input a number.

In order to attain the above object, a method for controlling a communication terminal in accordance with one aspect of the present invention is a method for controlling a communication terminal including: a display panel configured to display a plurality of keys; and a touch panel configured to detect a touch operation by a user, the touch panel being on the display panel, said method including the steps of: when the touch panel has detected a touch operation to one of the plurality of keys each of which is associated with a plurality of pieces of called party identifying information, causing the display panel to display a plurality of pieces of called party identifying information that are associated with the one of the plurality of keys; and when the touch panel has detected a state in which one of the plurality of pieces of called party identifying information that are associated with the one of the plurality of keys is selected, setting as a to-be-called phone number a phone number identified by the one of the plurality of pieces of called party identifying information.

According to the arrangement, (i) in the displaying step, the communication terminal displays the plurality of pieces of called party identifying information associated with the key touched by the touched operation and (ii) in the setting step, the communication terminal sets as a to-be-called phone number a phone number identified by a selected one of the plurality of pieces of called party identifying information. With the arrangement, the user can quickly set a to-be-called phone number by a simple operation of (i) touching any of the plurality of keys to thereby display pieces of called party identifying information associated with the touched key and (ii) selecting a desired called party from the displayed pieces of called party identifying information.

Furthermore, since each of the plurality of keys is associated with a plurality of pieces of called party identifying information, the user can select a desired called party from a larger number of called parties by the simple operation.

A program for causing a computer to operate as a communication terminal in accordance with one aspect of the present invention, said program causing the computer to function as each means of the communication terminal, and a computer-readable recording medium in which at least one of such programs is stored, are also encompassed in the scope of the present invention.

It should be noted that a combination of the feature recited in a certain claim and the feature recited in another claim is not limited to a combination of the feature recited in the certain claim and the feature recited in a claim(s) from which the certain claim depends. The feature recited in a certain claim can be combined with the feature recited in another claim that the certain claim does not refer, provided that the object of the present invention is achieved.

The present invention is not limited to the descriptions of the embodiments and modified examples, but may be altered within the scope of the claims. An embodiment derived from a proper combination of technical means disclosed in the embodiments is encompassed in the technical scope of the invention.

INDUSTRIAL APPLICABILITY

The present invention is suitably applicable to a communication terminal having a phone function and including a touch panel, such as a smart phone, a mobile phone, a fixed phone, a tablet PC and a facsimile.

REFERENCE SIGNS LIST 1 communication terminal
10 display panel
11 touch panel
12 control section (control means)
13 memory section
14 operation section
15 communication section
16 sound input/output section
21 number display area
22 numeric keypad (a plurality of keys)
23 CALL button
24 PHONEBOOK button
25 left arrow button

The invention claimed is:

1. A communication terminal, comprising:
a display panel configured to display a plurality of keys;
a touch panel configured to detect a touch operation by a user, the touch panel being on the display panel; and
control means for, when the touch panel has detected a touch operation to one of the plurality of keys each of which is associated with a plurality of pieces of called party identifying information, causing the display panel to display a plurality of pieces of called party identifying information that are associated with the one of the plurality of keys,
the control means being configured to, when the touch panel has detected a state in which one of the plurality of pieces of called party identifying information that are associated with the one of the plurality of keys is selected, set as a to-be-called phone number a phone number identified by the one of the plurality of pieces of called party identifying information,
the one of the plurality of pieces of called party identifying information is selected by a flick operation starting from the one of the plurality of keys which is touched by the touch operation,
the control means being configured to cause the display panel to display the plurality of pieces of called party identifying information around the one of the plurality of keys which has been touched through the touch operation.

2. The communication terminal according to claim 1, wherein the control means is configured to call the phone number which has been set as the to-be-called phone number.

3. The communication terminal according to claim 1, wherein the control means is configured to (i) cause the display panel to display the phone number which has been set as the to-be-called phone number and (ii) call the phone number in response to an instruction by the user.

4. The communication terminal according to claim 1, wherein the control means is configured to cancel the display of the plurality of pieces of called party identifying information that are associated with the one of the plurality of keys when, after the one of the plurality of keys is touched by the touch operation, the touch panel has detected a state in which a flick operation has been carried out by which an area of the display panel other than where the plurality of pieces of called party identifying information that are associated with the one of the plurality of keys are displayed is selected.

5. The communication terminal according to claim 1, wherein the plurality of keys constitute a numeric keypad including a plurality of numeric and symbol keys.

6. The communication terminal according to claim 5, wherein the control means is configured to, when the touch panel has detected a state in which the touch panel has become untouched after being touched without the flick operation, cancel the display of the plurality of pieces of called party identifying information that are associated with the one of the plurality of keys and accept as a directly-inputted number a number corresponding to the one of the plurality of keys which was touched by the touch operation.

7. A method for controlling a communication terminal, the communication terminal including: a display panel configured to display a plurality of keys; and a touch panel configured to detect a touch operation by a user, the touch panel being on the display panel,
said method comprising the steps of:
(a) when the touch panel has detected a touch operation to one of the plurality of keys each of which is associated with a plurality of pieces of called party identifying information, causing the display panel to display a plurality of pieces of called party identifying information that are associated with the one of the plurality of keys; and
(b) when the touch panel has detected a state in which one of the plurality of pieces of called party identifying information that are associated with the one of the plurality of keys is selected, setting as a to-be-called phone number a phone number identified by the one of the plurality of pieces of called party identifying information,
the one of the plurality of pieces of called party identifying information is selected by a flick operation starting from the one of the plurality of keys which is touched by the touch operation, in the step (a), the plurality of pieces of called party identifying information being displayed around the one of the plurality of keys which has been touched through the touch operation.

8. A non-transitory computer-readable recording medium in which a program for operating a computer as a communication device as set forth in claim 1 is stored, said program causing the computer to function as each means of the communication terminal.

* * * * *